106-89.   AU 115   EX
1-21-75   OR   3,861,929

United States Patent [19]
Deets et al.

[11] 3,861,929
[45] Jan. 21, 1975

[54] EXPANSIVE CEMENT AND ITS METHOD OF MANUFACTURE

[75] Inventors: John L. Deets, Griffith, Calument Township; Zvonimir T. Jugovic, Munster, North Township, both of Ind.

[73] Assignee: United States Steel Corporation, Pittsburgh, Pa.

[22] Filed: Oct. 27, 1972

[21] Appl. No.: 301,382

Related U.S. Application Data

[63] Continuation-in-part of Ser. No. 172,691, Aug. 18, 1971, abandoned.

[52] U.S. Cl. .................. 106/89, 106/104, 106/109
[51] Int. Cl. .................. C04b 7/02, C04b 7/04
[58] Field of Search .............. 106/89, 314, 104, 109

[56] References Cited
UNITED STATES PATENTS

| | | | |
|---|---|---|---|
| 3,215,549 | 11/1965 | Ericson | 106/90 |
| 3,251,701 | 5/1966 | Klein | 106/89 |
| 3,303,037 | 2/1967 | Klein | 106/89 |
| 3,411,924 | 11/1968 | Lapshin | 106/89 |
| 3,510,326 | 5/1970 | Miki | 106/89 |
| 3,775,143 | 11/1973 | Mikhailov et al. | 106/89 |

OTHER PUBLICATIONS

Blanks; Robert F., "The Technology of Cement and Concrete," Vol. I, Wiley & Sons, N.Y. 1955, pp. 40–42.

Mikhailov, V. V., "Stressing Cement," Fourth International Symposium on the Chemistry of Cement, Wash., D.C., 1960, pp. 927, 937–940.

*Primary Examiner*—Delbert E. Gantz
*Assistant Examiner*—James W. Hellwege
*Attorney, Agent, or Firm*—Ralph H. Dougherty

[57] ABSTRACT

A method of preparing an expansive cement having a controlled expansion and the same workability as normal Portland cement and the cement so prepared.

40 Claims, 4 Drawing Figures

3,861,929

EXPANSIVE CEMENT AND ITS METHOD OF MANUFACTURE

REFERENCE TO RELATED APPLICATION

This is a continuation-in-part application of our application Ser. No. 172,691, filed Aug. 18, 1971 now abandoned.

BACKGROUND OF THE INVENTION

Because of the low tensile strength of the cured material, the inherent shrinkage characteristics of concretes made with conventional cements cause cracks on hardening and drying. Efforts have been made to overcome these weaknesses by various mechanical means, such as pre-stressing or post-stressing; however, such methods often require elaborate techniques and equipment. Efforts have also been made to produce cement which, when mixed with water, will expand and thereby compensate, to some degree or entirely, for the usual shrinkage of Portland cement concrete.

Expansive cement is a cement which, when mixed with water, forms a paste that, during and after setting and hardening, increases significantly in volume. Shrinkage-compensating concrete, mortar or grout is an expansive cement concrete, mortar or grout, in which expansion, if restrained, induces compressive stresses which approximately offset tensile stresses in the concrete induced by drying shrinkage. Self-stressing concrete, mortar or grout is an expansive cement concrete, mortar or grout, in which expansion is restrained inducing compressive stresses of a high enough magnitude to result in a significant compression in the concrete after drying shrinkage has occurred.

In most of the expansive cement formulations, the formation of ettringite ($3CaO.Al_2O_3.3CaSO_4.32H_2O$) is the source of the expansive force. Early investigators of ettringite in cement recognized the potential of using this compound for inducing stresses on reinforcing steel, thus developing, during the curing period, a slight compression in the concrete. It is desirable to have sufficient initial compression in the concrete to prevent the development of tensile stress during the drying period, thus increasing its crack resistance. The development and the properties of various expansive cements have been described in many publications and are summarized in the report of ACI Committee 223 entitled, "Expansive Cement Concretes — Present State of Knowledge" published in the Journal of the American Concrete Institute, Vol. 67, No. 8, Aug., 1970, pp. 583–610.

Although many investigators in various countries have discovered ways of producing expansive cements, most of these were not commercially made because of inability to reproduce the cements with reliable properties as well as due to complications in the technology of manufacture. Non-shrinking and self-stressing expansive cements as produced heretofore have had some or all of the following disadvantages:

1. short workability time in concrete as compared to normal Portland cement in concrete;
2. the necessity of special precautions during the curing period of conceret;
3. limited storage time — the expansive potential deteriorates with age;
4. the necessity of control agents for limiting the rate and the magnitude of expansion; and
5. the necessity of complicated and lengthy hydrothermal treatment of the concrete.

It is an object of this invention to provide an expansive cement which, regardless of the magnitude of the expansive potential, has, in preparation of the concrete, the same workability characteristics as any normal Portland cement concrete.

It is also an object of this invention to provide an expansive cement for shrinkage compensating concrete, mortar or grout which needs no special curing or precautions other than those normally recommended for any quality Portland cement concrete.

SUMMARY OF THE INVENTION

We have discovered that relatively small amounts of calcium aluminate cement or clinker, about 2 to 17 percent, together with Portland cement or clinker, and calcium sulfate expressed as percent excess $SO_3$ over optimum $SO_3$ determined according to ASTM Standard C563–70 and equal to about 2 to 24 percent, when properly proportioned, give cements having controlled expansive properties. Since an expansive cement must have a predictable and controllable magnitude of expansion to be useful, we have discovered the necessary relationships which can be easily controlled and thereby insure manufacture of cement with consistent properties. This is of particular importance for the relatively low levels of expansive potential of a cement used in shrinkage-compensating concrete.

Our improved expansive cement composition, consisting of Portland cement or clinker, calcium aluminate cement or clinker and calcium sulfate has the following improved properties:

1. The workability, placement, compaction and finishing characteristics, all at normal water requirements witth no excessive slump loss, are equal to those of a normal Portland cement concrete.
2. The amount of expansion of the particular formulation can be readily controlled and duplicated making it applicable to special field requirements.
3. The curing of shrinkage-compensating concrete is subject to only those precautions commonly recognized for curing ordinary concrete in hot or cold weather.
4. The expansive potential of the shrinkage-compensating concrete is optimized in a relatively short curing period of 3–4 days.
5. Storage requires no limitations in time or facilities other than those recommended for normal Portland, calcium aluminate, or any other hydraulic cement.
6. Manufacture requires no special expansive components but uses commercially produced hydraulic cements or clinkers (Portland and calcium aluminate) and calcium sulfate.
7. The strengths of mortars or concrete are equal to or better than those obtained with regular Portland cement mortar or concrete when suitable restraint is used.
8. The cement can be produced by either intergrinding, blending or a combination of grinding and blending of said components in the proportions recommended for specific range of expansive characteristics.

composition are ground to final size prior to blending, we prefer to use calcium sulfate dihydrate (gypsum). Where the components of our cement are combined before grinding to final size, we prefer to limit the dihydrate form to a maximum of about 10 weight percent based on the total composition. Any calcium sulfate requirement over 10 weight percent is preferably met by the addition of anhydrous calcium sulfate. Calcium sulfate in hemihydrate form ($CaSO_4 \cdot \frac{1}{2}H_2O$) should be present in our cement product in an amount from about 2 to 8 percent by weight of the final expansive cement composition, and preferably will not exceed 60 percent of the total calcium sulfate present in the composition. The hemihydrate is desirable for control of early hydration reactions.

The following table summarizes the proportions of the above constituents of our composition which result in concretes having the beneficial results of our invention.

Table I

| Component | Useable Range in Parts Shrinkage-Compensation | Self-Stressing | Preferred Range in Parts Shrinkage-Compensating | Self-Stressing |
|---|---|---|---|---|
| Calcium Aluminate Cement or Clinker | 2–17 | 3.5–17 | 2–9 | 6–17 |
| Excess $SO_3$ (added in the forms of calcium sulfate) | 2–24 | 6–24 | 3–11 | 9–24 |
| Portland Cement or Clinker | 100 | 100 | 100 | 100 |

Figure 4:
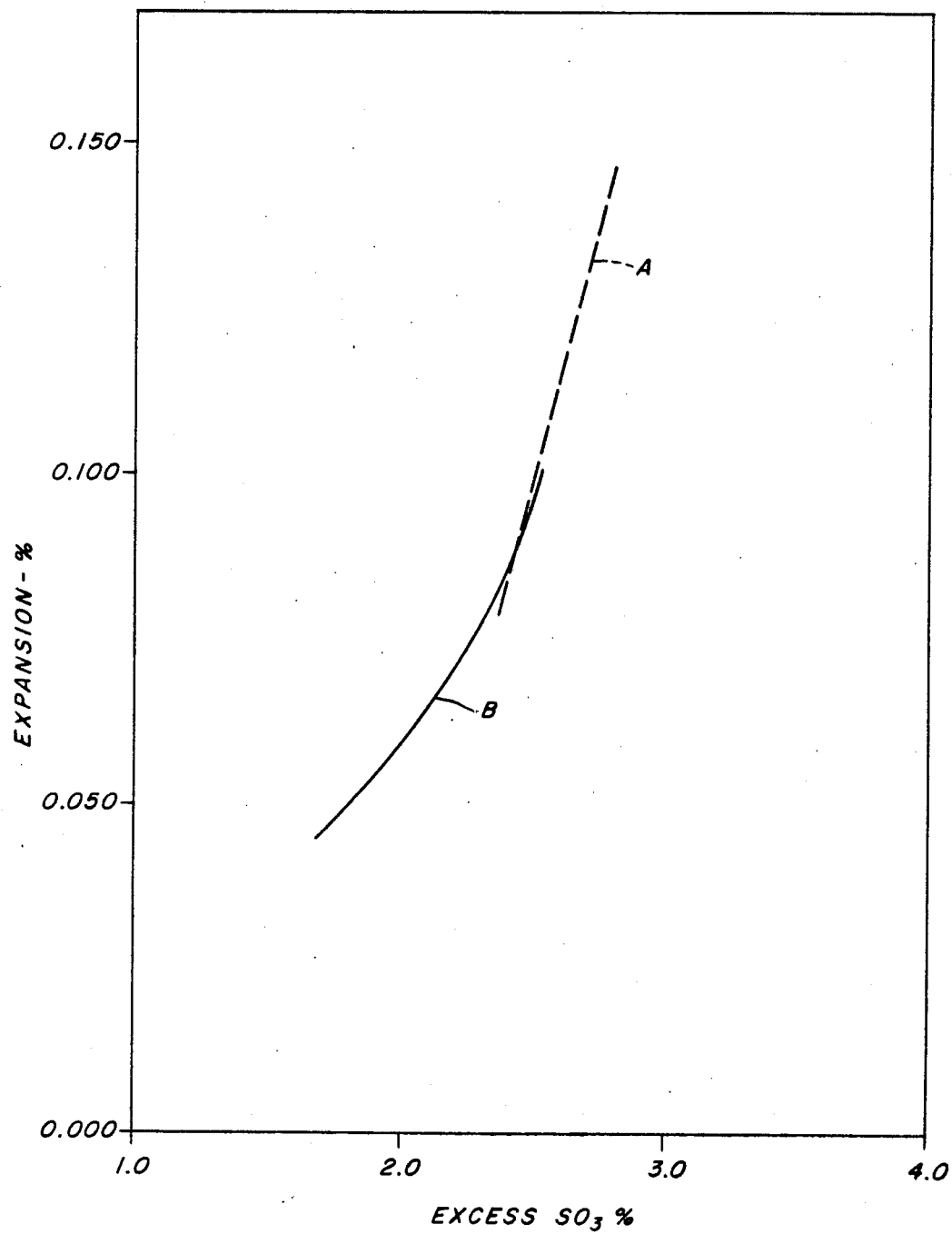

FIG. 4 is a graph of the percent mortar expansion plotted against the excess $SO_3$ over optimum for two cements of our invention containing different calcium aluminate cements and different quantities of calcium aluminate cement. The expansion was determined after three days of curing at 73°F. Percent restraint was 0.36. Curve A is that of mortar made with a cement containing 5.6 weight percent calcium aluminate cement having an iron content of about 2 to 2.5 percent as $Fe_2O_3$. Curve B is that of mortar made with a cement containing 2.0 weight percent of a very low iron (about 1% $Fe_2O_3$) calcium aluminate cement.

DETAILED DESCRIPTION

The controlled expansive cement of our invention is prepared from a mixture of Portland cement or clinker, calcium aluminate cement or clinker, and calcium sulfate which has been ground and blended to homogeneity. Any Portland cement clinker which would produce a cement meeting ASTM Standard C150–70 is suitable for use in our composition. Preferably, the minimum strength potential at the optimum $SO_3$ level of the clinker when ground into a Portland cement and tested by ASTM Standard C563 –70 is above 3,600 psi. The clinker is produced by conventional methods.

Nor are special calcium aluminate cements necessary. Any calcium aluminate cement or clinker is suitable for use in our composition with the proviso only that the maximum iron content expressed as $Fe_2O_3$ of the cement or clinker not exceed about 20 percent, preferably not exceeding about 5 percent. The clinker or cement is produced by conventional methods.

The calcium sulfate may be added to our cement either in hydrous forms or in anhydrous and hydrous forms together. It may be added in mineral form, preferably as gypsum. When the three components of our The calcium aluminate cement or clinker content of our composition must be kept above about 2 weight percent to obtain any expansion. When the calcium aluminate cement or clinker is above 17 weight percent, it may set too quickly. When the excess $SO_3$ over optimum is below 2 weight percent, there is insufficient expansion. When the excess $SO_3$ over optimum is above about 24 weight percent, the strength of the concrete may be adversely affected.

The procedure for preparing the controlled expansive cement of our invention is as follows. The first step is to determine the optimum $SO_3$ of the particular Portland cement clinker to be used in the composition. The procedure followed is set forth in ASTM Standard C563–70.

Figure 1:
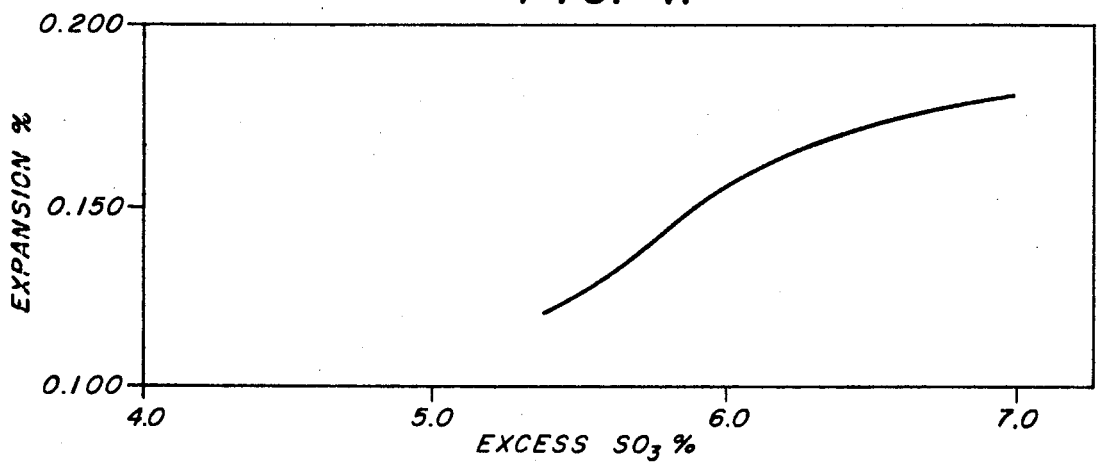
FIG. 1 is a graph of the percent expansion of a concrete using a cement of our invention plotted against the excess $SO_3$ over optimum $SO_3$ determined according to ASTM Standard C563–70. The results shown are for a composition containing 5.5 weight percent, based on the total composition, of low iron (less than 2.5% as $Fe_2O_3$) calcium aluminate cement cured in a hot water bath (145°F) until not further expansion was noted (under 24 hours). The percent restraint was 0.67.
Figure 2:
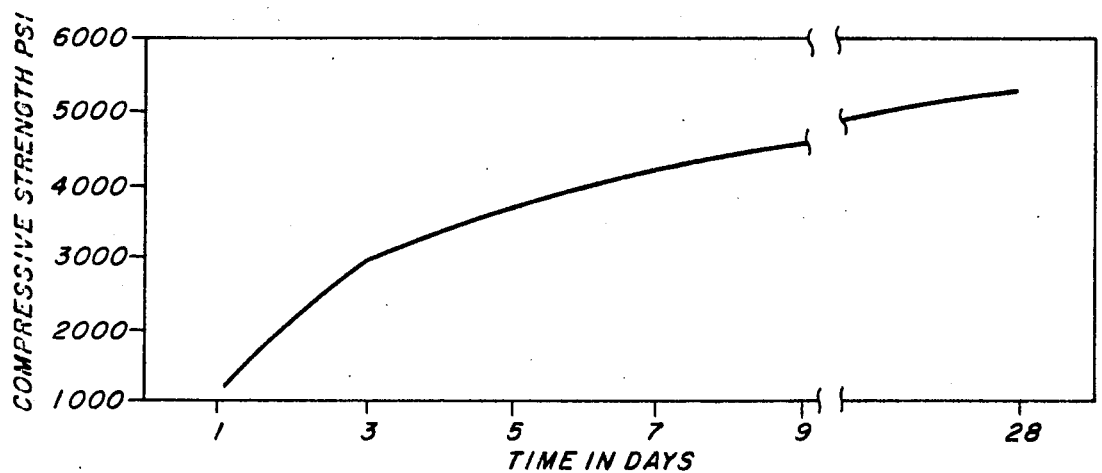
FIG. 2 is a graph of the compressive strength of a mortar using a cement of our invention plotted against time.
Figure 3:
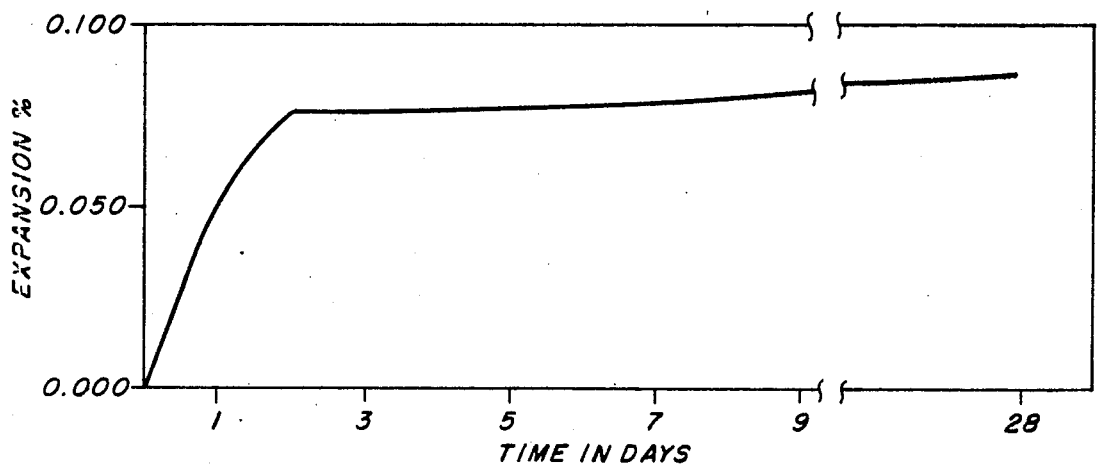
FIG. 3 is a graph of the percent expansion of a mortar using a cement of our invention plotted against time. In both FIGS. 2 and 3, based on the total composition, the low iron calcium aluminate cement was 5.6 weight percent and the percent excess $SO_3$ over optimum was 2.4. P rcent restraint was 0.36. The cement mortar was cured at 73°F for the period of the test.

Once the optimum $SO_3$ of the particular Portland cement or clinker is determined, a calcium aluminate cement or clinker level is selected in the range of from about 2 to about 17 percent by weight of the Portland cement. When a shrinkage-compensating cement is to be prepared, the calcium aluminate cement or clinker should be in the range of from about 2 to about 17 percent, preferably from about 2 to about 9 percent. When a self-stressing cement is to be prepared, the calcium aluminate cement or clinker should comprise from about 3.5 to about 17 weight percent, preferably from about 6 to about 17 weight percent. Additional quantities of $SO_3$ are then added to different batches of Portland cement-calcium aluminate cement mixtures and the expansion at each $SO_3$ level determined. The results are then plotted on a graph such as that shown in FIG. 1 using restraint systems and curing conditions suitable for the proposed ultimate use. The results will vary depending on the amount of calcium aluminate cement present in the mixture and also on the particular calcium aluminate cement used. The expansion occasioned by the excess $SO_3$ may then be determined at different calcium aluminate cement levels and the composition having the desired rate of expansion and strength characteristics is chosen. Once the effect of different levels of excess $SO_3$ has been plotted, it is only necessary to add the same quantity of excess $SO_3$ to subsequent batches of cement to obtain the same expansion. Thus, when a cement is to be prepared from a new batch of Portland cement clinker, the optimum $SO_3$ is determined according to ASTM Standard C563-70, the predetermined amount of calcium aluminate cement or clinker is added and the excess $SO_3$ level necessary for the desired expansion is determined by reference to a graph comparable to FIG. 1. We have found that in preparing shrinkage-compensating cements, the excess $SO_3$ level should be in the range of about 2 to 24 weight percent, preferably about 3 to 11 weight percent. When preparing a self-stressing cement, the excess $SO_3$ level should be in the range of about 6 to 24 weight percent, preferably about 9 to 24 weight percent of the Portland cement.

Once the proportions of the three constituents of our composition have been chosen by the above method they are combined to form a controlled expansive cement having the desired expansion level. The constituents may be combined and then interground or the constituents may be ground separately and then blended to form the cement.

When the cement is to be prepared by intergrinding the components, the proper proportions are selected and fed to the grinding mill. We prefer to limit the amount of $SO_3$ equivalent obtained from calcium sulfate dihydrate (gypsum) to a level of about 10 weight percent of the total composition. If an additional quantity of calcium sulfate is necessary to provide the desired $SO_3$ level, we prefer to add the calcium sulfate in the anhydrous form provided sufficient hemihydrate is present in the composition. The constituents are ground by conventional means to meet the fineness requirements of ASTM Standard C150-70 as tested by ASTM Standard C115-70.

In a preferred method, the constituents of our composition are first separately ground and then blended in any conventional manner. The calcium aluminate cement constituent should be ground to a Wagner surface about about 1,350 $cm^2/gm$, preferably above about 1,400 $cm^2/gm$. The Portland cement clinker should be ground to a Wagner surface above about 1,600 $cm^2/gm$, preferably above about 1,800 $cm^2/gm$. The Portland cement clinker may be ground with an amount of gypsum that will provide the optimum $SO_3$ content as determined by ASTM Standard C563-70. The calcium sulfate, preferably in the dihydrate form, should be ground to a point where at least 70 percent will pass a No. 100 sieve (USA Standard) and preferably to a point where at least 85 percent will pass a No. 100 sieve. After grinding, the required proportions of each constituent are blended. If no gypsum or an insufficient amount of gypsum is ground with the Portland cement clinker to provide at least 2 percent hemihydrate in the final expansive cement composition, sufficient calcium sulfate in the hemihydrate form should be added to provide this minimum.

Although our novel process and cement have been described in terms of Portland cement or clinker, it should be understood that other cements or clinkers may be substituted for the Portland cement or clinker. Thus, references to Portland cement or clinker in this specification are meant to include blended hydraulic cements as well. Blended hydraulic cements suitable for use in cements of our invention are set forth in ASTM Standard C595-68 under the designation Portland Blast-Furnace Slag Cement (Types IS and IS-A) and Portland-Pozzolan Cement (Types IP, IP-A, P, and PA).

The following examples will further illustrate the preparative techniqes useful in practicing our invention. They should of course be taken as being merely illustrative and not limiting in any way.

EXAMPLE 1

A shrinkage-compensating expansive cement was prepared from 86.3 parts by weight Portland cement clinker, 5.6 parts by weight low iron content calcium aluminate cement clinker and 8.1 parts by weight $CaSO_4.2H_2O$ equivalent to 3.6 parts by weight $SO_3$. The optimum $SO_3$ level of the Portland cement clinker was determined using ASTM Standard C563-70 as 1.7 percent. The expansive cement was prepared by intergrinding the components in a laboratory mill to a Wagner surface of 1,900 $cm^2/gm$. The expansion of this cement was measured on 2×2×10 inches restrained mortar prisms using a length comparator conforming with that described in ASTM Standard C490-70. The mortar mix consisted of the cement and graded Ottawa sand in a 1:2.75 mix by weight with sufficient water to provide a flow of 100-115 percent comparable with ASTM Standard C109-64. Mixing was done in accordance with ASTM Standard C305-65. The molds were of such dimensions as to provide sufficient space to insert a restraining cage consisting of a 3/16 inch diameter threaded mild steel rod having an overall length of 11-9/16 inch ± 1/16 inch and two mild steel end plates 2×2×3/8 inch. The end plates were positioned on the rod to provide a 10 inch opening between them and were secured in this position with locknuts. The steel cages were assembled and measured for length in the comparator prior to insertion in the mold. Subsequent measurements were referred to this initial measurement. Molded specimens were placed in the moist cabinet (73° ± 3°F, ± 90 percent relative humidity) for 5-½ hours, demolded and then placed in saturated lime water (73° ± 3°F) until completion of the test. At the conditions as set forth above, the percent expansion after three days was 0.077 percent and after 7 days, 0.078 percent. The compressive strength determined in accordance with ASTM Standard C109-64 was 2,950 psi (3 day) and 4,270 psi (7 day).

EXAMPLE 2

The procedure of Example 1 was followed using a Portland cement prepared from 83.8 parts by weight Portland cement clinker, 5.6 parts by weight low iron content calcium aluminate cement clinker, and 10.6 parts by weight $CaSO_4.2H_2O$ (equivalent to 4.7 parts by weight $SO_3$). The Portland cement had an optimum $SO_3$ level of 2.6 percent. The 3-day expansion of this cement composition was 0.091 percent and the 7-day expansion was 0.087 percent. Compressive strengths were 3,080 psi (3 day) and 4,230 psi (7 day).

EXAMPLE 3

A shrinkage-compensating expansive cement was prepared from 85.6 parts by weight Portland cement clinker, 6.0 parts by weight low iron content calcium aluminate cement clinker, 5.3 parts by weight $CaSO_4.2H_2O$ equivalent to 2.3 parts by weight $SO_3$, and 3.1 parts by weight $CaSO_4.\frac{1}{2}H_2O$ equivalent to 1.7 parts by weight $SO_3$. The optimum $SO_3$ level of the Portland cement clinker was 1.8 percent. The expansive cement was prepared by intergrinding the components in a laboratory mill to a Wagner surface of 1,890 cm$^2$/g. The 3-day expansion of this cement composition was 0.089 percent and the 7-day expansion was 0.093 percent. Compressive strengths were 1,950 psi (3 day) and 3,780 psi (7 day).

Table II is a comparison of cement compositions of Examples 1, 2 and 3. It shows that the percent expansion of the three cement compositions having approximately equal excess $SO_3$ is approximately equal. It is therefore apparent that the procedure of this invention makes it possible to control both the magnitude and rate of expansion of the expansive cement composition.

Table II

| Cement | Compressive Strength psi | | Expansion, % | |
|---|---|---|---|---|
|  | 3 Day | 7 Day | 3 Day | 7 Day |
| Ex. 1 | 2950 | 4270 | 0.077 | 0.078 |
| Ex. 2 | 3080 | 4230 | 0.091 | 0.087 |
| Ex. 3 | 1950 | 3780 | 0.089 | 0.093 |

EXAMPLE 4

Self-stressing concrete mixes were prepared composed of 8 ¼ sacks of cement (94 lbs. each) per cubic yard of concrete, a water to cement ratio equal to 0.517 by weight, and a mixture of concrete sand meeting ASTM C33-67 specifications for fine aggregates and a commercially prepared lightweight aggregate of expanded crushed shale having a maximum size of one half inch where the sand constituted 74 percent of the total aggregate by weight, or 37 percent by volume.

Three different cement compositions were prepared having the proportions listed in Table III. Prisms having a cross sectional shape of 3×3 inches and a length of 10 inches were cast from each concrete mix. Each prism was provided with a longitudinal restraining rod fabricated from high strength stainless steel (No. 431) with a diameter of 0.274 inch. The effective gauge length of the rod between the end plates was 10 inches. Overall length of the rod was 11 ¾ inches. Lateral reinforcement consisted of six squares of 12 gauge 2×2 inch mesh equally spaced throughout the length of the specimen. The longitudinal rod had ends of a design which could be conveniently used in a length comparator conforming to the type described in ASTM Standard C490-70. The length of the longitudinal restraining rod was measured prior to molding the specimens. All later measurements were referred to this initial measurement. The specimens were cured in a hot water bath, held at 1450°F until no further expansion was noted. This occurred within 24 hours. The percent expansion and the calculated compressive stress based on the yield strength of the steel are listed in Table IV.

Table III

| Cement | Composition in Parts | | | | |
|---|---|---|---|---|---|
|  | Portland Cement Clinker | Calcium Aluminate Cement Clinker[1] | Gypsum[2] | Anhydrite[3] | Excess SO$_3$ weight percent |
| 1 | 80.2 | 4.1 | 7.6 | 8.1 | 5.9 |
| 2 | 78.0 | 5.5 | 8.1 | 8.4 | 6.3 |
| 3 | 72.8 | 7.0 | 20.2 | 0 | 7.4 |

[1] Iron Content less than 2.5% as $Fe_2O_3$
[2] Gypsum = 44.5% $SO_3$
[3] Anhydrite = 55.5% $SO_3$ Table IV

| Cement | Expansion, % | Calc. Compressive Stress, psi |
|---|---|---|
| 1 | 0.116 | 225 |
| 2 | 0.150 | 291 |
| 3 | 0.220 | 427 |

We claim:

1. The method of controlling the degree of expansion of an expansive cement comprising adding a quantity of calcium sulfate to a mixture consisting essentially of Portland and calcium aluminate cements or clinkers, said calcium aluminate cement being present in an amount from about 2 to 17 weight percent of the Portland cement, to provide an excess of $SO_3$ over the optimum $SO_3$ of about 2 to 24 weight percent of the Portland cement, said optimum being determined in accordance with ASTM Standard C563-70 with said excess of $SO_3$ being sufficient to give a cement having the desired expansion level.

2. The method of claim 1 wherein about 2 to 8 weight percent of the expansive cement composition is $CaSO_4.\frac{1}{2}H_2O$.

3. The method of claim 2 wherein the calcium sulfate present in hemihydrate form is no greater than 60 percent of the total calcium sulfate in the composition.

4. The method of claim 1 wherein the calcium sulfate is added in the form of gypsum.

5. The method of claim 1 wherein the expansive cement is a shrinkage-compensating cement, the calcium aluminate cement is about 2 to 9 weight percent, and the excess of $SO_3$ is about 3 to 11 weight percent of the Portland cement.

6. The method of claim 1 wherein the expansive cement is a self-stressing cement, the calcium aluminate cement or clinker is about 3.5 to 17 weight percent and the excess of $SO_3$ is about 6 to 24 weight percent of the Portland cement or clinker.

7. The method of claim 1 wherein the expansive cement is a self-stressing cement, the calcium aluminate cement or clinker is about 6 to 17 weight percent, and the excess of $SO_3$ is about 9 to 24 weight percent of the Portland cement or clinker.

8. The method of claim 1 wherein calcium sulfate is added as gypsum up to about 10 weight percent of the total composition and the remainder of the calcium sulfate required to give said excess of $SO_3$ over the optimum $SO_3$ is added as anhydrous calcium sulfate.

9. The method of reproducing the expansion level of a first expansive cement in a second expansive cement comprising determining the excess of $SO_3$ over the optimum $SO_3$ in said first expansive cement and adding a quantity of calcium sulfate to a second expansive cement sufficient to give that same excess of $SO_3$ over the optimum $SO_3$ in said second expansive cement where:
  a. the optimum $SO_3$ is determined in accordance with ASTM Standard C563-7;
  b. the expansive cements consist essentially of Portland cement, calcium aluminate cement, and calcium sulfate;
  c. the amount and type of calcium aluminate cement is the same in said first expansive cement and said second expansive cement; and
  d. the excess of $SO_3$ over the optimum $SO_3$ is in the range of 2 to 24 weight percent and the calcium aluminate cement is in the range of 2 to 17 weight percent of the Portland cement.

10. The method of claim 9 wherein about 2 to 8 weight percent of the expansive cement composition is $CaSO_4 \cdot \tfrac{1}{2}H_2O$.

11. The method of claim 10 wherein the calcium sulfate present in hemihydrate form is no greater than 60 percent of the total calcium sulfate in the composition.

12. The method of claim 9 wherein the expansive cement is a shrinkage-compensating cement, the calcium aluminate cement is about 2 to 9 weight percent and the excess $SO_3$ is about 3 to 11 weight percent of the Portland cement.

13. The method of claim 9 wherein the expansive cement is a self-stressing cement, the calcium aluminate cement is about 3.5 to 17 weight percent and the excess $SO_3$ is about 6 to 24 weight percent of the Portland cement.

14. The method of claim 9 wherein the expansive cement is a self-stressing cement, the calcium aluminate cement is about 6 to 17 weight percent and the excess $SO_3$ is about 9 to 24 weight percent of the Portland cement.

15. The method of claim 9 wherein the calcium sulfate is added as gypsum.

16. The method of claim 9 wherein the components are combined before grinding to final size, in which the calcium sulfate is added as gypsum to a maximum of about 10 weight percent of the total composition and the remainder of the calcium sulfate required to give the determined excess of $SO_3$ over the optimum $SO_3$ is added as anhydrous calcium sulfate.

17. The process for preparing a cement having controlled expansive properties consisting essentially of Portland cement, calcium aluminate cement in the amount from about 2 to 17 weight percent of the Portland cement, and calcium sulfate to provide excess $SO_3$ over the optimum $SO_3$ of about 2 to 24 weight percent of the Portland cement, said optimum being determined by ASTM Standard C563-70 comprising:
  a. determining the optimum $SO_3$ for the Portland cement,
  b. grinding the Portland cement constituent to an average minimum Wagner surface of at least 1,600 $cm^2/gm$,
  c. grinding the calcium aluminate cement constituent to an average minimum Wagner surface of at least 1,350 $cm^2/gm$,
  d. grinding the calcium sulfate so that at least 70 percent passes through a No. 100 sieve, and
  e. blending to homogeneity the Portland cement and the calcium aluminate cement with a sufficient excess of $SO_3$ over the optimum $SO_3$ determined in step (a), added as calcium sulfate to give a cement having the desired expansion level.

18. The process of claim 17 wherein the calcium sulfate is ground so that at least 85 percent passes through a No. 100 sieve.

19. The process of claim 17 wherein the calcium sulfate is added in the form of gypsum.

20. The process of claim 17 wherein the cement is a shrinkage-compensating cement, the calcium aluminate cement is about 2 to 9 weight percent of the Portland cement and the excess $SO_3$ is about 3 to 11 weight percent of the Portland cement.

21. The process of claim 17 wherein the cement is a self-stressing cement, the calcium aluminate cement is about 3.5 to 17 weight percent of the Portland cement and the excess $SO_3$ is about 6 to 24 weight percent of the Portland cement.

22. The process of claim 17 wherein the cement is a self-stressing cement, the calcium aluminate cement is about 6 to 17 weight percent of the Portland cement and the excess $SO_3$ is about 9 to 24 weight percent of the Portland cement.

23. The process of claim 17 wherein 2 to 8 weight percent of the cement is $CaSO_4 \cdot \tfrac{1}{2}H_2O$.

24. The process of claim 23 wherein the calcium sulfate present in hemihydrate form is no greater than 60 percent of the total calcium sulfate in the cement.

25. The process of claim 17 wherein the Portland cement is replaced by a blended hydraulic cement selected from Portland blast furnace slag cements and Portland Pozzolan cements meeting ASTM Standard C595-68.

26. The process for preparing a cement having controlled expansive properties consisting essentially of Portland cement clinker, calcium aluminate cement clinker in the amount from about 2 to 17 weight percent of the Portland cement clinker, and calcium sulfate to provide excess $SO_3$ over the optimum $SO_3$ of about 2 to 24 weight percent of the Portland cement clinker, said optimum being determined by ASTM Standard C563-70 comprising:
  a. determining the optimum $SO_3$ for the Portland cement clinker,
  b. mixing the Portland cement clinker and calcium aluminate cement clinker with a sufficient excess of $SO_3$ over the optimum $SO_3$ determined in step a. added as calcium sulfate to give a cement having the desired expansion level, and
  c. grinding the mixture to an average minimum Wagner surface of 1,600 $cm^2/gm$.

27. The process of claim 26 in which the calcium sulfate is added as gypsum to a maximum of about 10 weight percent of the total composition and the remainder of the calcium sulfate required to provide the determined excess of $SO_3$ over the optimum $SO_3$ is added as anhydrous calcium sulfate.

28. The process of claim 26 wherein 2 to 8 weight percent of the cement is $CaSO_4 \cdot \tfrac{1}{2}H_2O$.

29. The process of claim 28 wherein the calcium sulfate present in hemihydrate form is no greater than 60 percent of the total calcium sulfate in the cement.

30. The process of claim 26 wherein the cement is a shrinkage-compensating cement, the calcium aluminate cement clinker is about 2 to 9 weight percent of the Portland cement clinker and the excess $SO_3$ is about 3 to 11 weight percent of the Portland cement clinker.

31. The process of claim 26 wherein the cement is a self-stressing cement, the calcium aluminate cement clinker is about 6 to 17 weight percent of the Portland cement clinker and the excess $SO_3$ is about 9 to 24 weight percent of the Portland cement clinker.

32. The process of claim 26 wherein the Portland cement clinker is replaced by a blended hydraulic cement selected from Portland blast furnace slag cements and Portland Pozzolan cements meeting ASTM Standard C595-68.

33. An expansive cement having controlled expansive properties consisting essentially of Portland cement, calcium aluminate cement in an amount from about 2 to 17 weight percent of the Portland cement, and calcium sulfate to provide excess $SO_3$ over the optimum $SO_3$ of about 2 to 24 weight percent of the Portland cement, said optimum being determined by ASTM Standard C563-70.

34. The expansive cement of claim 33 wherein the calcium sulfate is added in the form of gypsum.

35. The expansive cement of claim 33 wherein about 2 to 8 weight percent of the cement is $CaSO_4.\frac{1}{2}H_2O$.

36. The expansive cement of claim 35 wherein the calcium sulfate present in hemihydrate form is no greater than 60 percent of the total calcium sulfate in the cement.

37. The expansive cement of claim 33 wherein said cement is a shrinkage-compensating cement, the calcium aluminate cement is about 2 to 9 weight percent of the Portland cement and the excess $SO_3$ is about 3 to 11 weight percent of the Portland cement.

38. The expansive cement of claim 33 wherein said cement is a self-stressing cement, the calcium aluminate cement is about 3.5 to 17 weight percent of the Portland cement and the excess $SO_3$ is about 6 to 24 weight percent of the Portland cement.

39. The expansive cement of claim 33 wherein said cement is a self-stressing cement, the calcium aluminate cement is about 6 to 17 weight percent of the Portland cement and the excess $SO_3$ is about 9 to 24 weight percent of the Portland cement.

40. The expansive cement of claim 33 wherein the Portland cement is replaced by a blended hydraulic cement selected from Portland blast furnace slag cements and Portland Pozzolan cements meeting ASTM Standard C595-68.

* * * * *

UNITED STATES PATENT OFFICE
CERTIFICATE OF CORRECTION

Patent No. 3,861,929            Dated January 21, 1975

Inventor(s) John L. Deets et al.

It is certified that error appears in the above-identified patent and that said Letters Patent are hereby corrected as shown below:

Title Page at 75 "Calument" should read -- Calumet --.

Column 1, line 54, "concernt" should read -- concrete --.

Column 3, line 18, "P rcent" should read -- Percent --.

Column 6, line 44, "$\pm$ 90 percent" should read
                     -- + 90 percent --.

Column 8, line 7, "1450°F" should read -- 145°F --.

Column 9, line 15, "C563-7" should read -- C563-70 --.

Signed and sealed this 17th day of June 1975.

(SEAL)
Attest:

RUTH C. MASON
Attesting Officer

C. MARSHALL DANN
Commissioner of Patents
and Trademarks